Hannah Munson's Automatic Table for teaching

United States Patent Office.

HANNAH MUNSON, OF ROCKFORD, ILLINOIS, ADMINISTRATRIX OF THE ESTATE OF WILLIAM C. MUNSON, DECEASED.

Letters Patent No. 72,070, dated December 10, 1867.

IMPROVEMENT IN AUTOMATIC TABLES FOR TEACHING.

The Schedule referred to in these Letters Patent and making part of the same.

TO ALL WHOM IT MAY CONCERN:

Be it known that I, HANNAH MUNSON, adminstratrix of William C. Munson, deceased, of Rockford, in the county of Winnebago, and in the State of Illinois, who invented certain new and useful Improvements in Automatic Tables, do hereby declare that the following is a full, clear, and exact description thereof, reference being had to the accompanying drawings, and to the letters of reference marked thereon.

Figure 1:
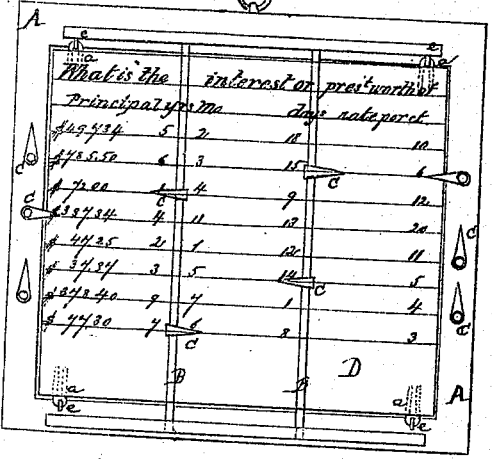

In the annexed drawings, making part of this specification, A represents a square frame, provided at its top and bottom with hooks e e. D D represent charts, which are provided at their upper ends with suitable inscriptions, as seen, and which are ruled horizontally and vertically with any required number of lines. These charts are provided with loops a', which catch over the hooks e e, for the purpose of securing them in the frames. C C represent pointers, which are pivoted to the sides of the frame, as well as to bars or rods which lie across the face of the frame, as seen at B B. The bars B B are used for each vertical line upon the face of the chart, and are capable of being removed or being separated or moved closer together. These charts are provided upon their faces with inscriptions, words, and figures, similar to those seen in the Figures 1, 2, and 3.

The object of this chart is to propound questions or problems to scholars quickly and readily, and which may be varied instantly without the voice of the teacher.

The heading or inscription upon the first figure reads thus: "What is the interest or present worth of?" and is explained as follows: The first pointer points to the sum, $387 34; the second to 1 year; the third to 6 months; the fourth to 14 days, and the fifth and sixth to 6 per cent. The child at once understands the question to be, What is the interest on three hundred and eighty-seven dollars and thirty-four cents for one year, six months, and fourteen days, at the rate of six per cent. It will readily be seen that a change in the direction of any one of the pointers will vary the question.

Figure 2:
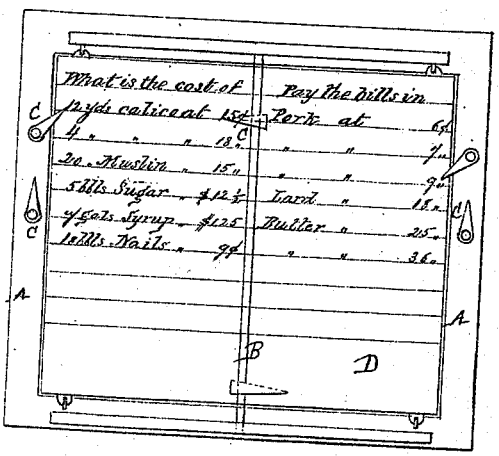
Figure 3:
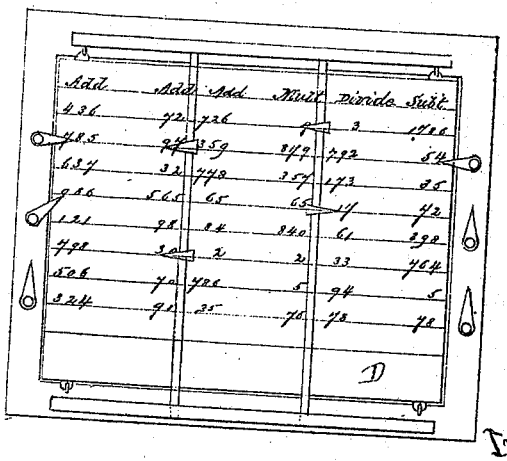

The chart in Figure 2 asks the question, What is the cost of twelve yards of calico at fifteen cents per yard? and further asks how much pork it would take, at nine cents per pound, to pay the bill.

These charts may be varied at pleasure, and can be made of great service to the teacher, as they save much time and much talking in the propounding of problems.

Having thus fully described the invention, what I claim as new, and desire to secure by Letters Patent, is—

The combination of the frame A with its pivoted pointers C C and hooks e e, and movable bars B B with pointers and charts D, as constructed, the whole being arranged and used substantially as and for the purposes specified.

In testimony that I claim the foregoing, I have hereunto set my hand, this 22d day of May, 1867.

HANNAH MUNSON.

Witnesses:
JAMES W. HENRY,
JAMES H. SHIRLAND.